US006471915B1

(12) United States Patent
Bell

(10) Patent No.: US 6,471,915 B1
(45) Date of Patent: Oct. 29, 2002

(54) METHOD FOR DISACIDIFYING PAPER PRODUCTS WITH PRINTINGS OR INSCRIPTIONS

(76) Inventor: Oswald Bell, Passauerstrasse 16, D-90480, Nuremberg, D-90480 (DE)

( * ) Notice: Subject to any disclaimer, the term of this patent is extended or adjusted under 35 U.S.C. 154(b) by 0 days.

(21) Appl. No.: 09/601,944

(22) PCT Filed: Feb. 9, 1999

(86) PCT No.: PCT/DE99/00346

§ 371 (c)(1), (2), (4) Date: Oct. 19, 2000

(87) PCT Pub. No.: WO99/41454

PCT Pub. Date: Aug. 19, 1999

(30) Foreign Application Priority Data

Feb. 10, 1998 (DE) ........................................ 198 05 271

(51) Int. Cl.[7] ................................................ B01J 19/00

(52) U.S. Cl. ......................... 422/40; 427/479; 118/300; 118/313; 118/315

(58) Field of Search ............................ 422/40; 427/479, 427/421, 424; 118/300

(56) References Cited

FOREIGN PATENT DOCUMENTS

| | | |
|---|---|---|
| DE | 4114075 | 11/1992 |
| DE | 4436635 | 4/1996 |
| EP | WO 9726409 | 7/1997 |

OTHER PUBLICATIONS

International Search Report.

*Primary Examiner*—Terrence R. Till
*Assistant Examiner*—Sean E. Conley
(74) *Attorney, Agent, or Firm*—Merchant & Gould, P.C.

(57) ABSTRACT

The present invention relates to a method as well as a device for deacidification treatment of inscribed or printed paper products (in the following called "books" for short), in which method the pages of the book to be treated are fanned open by means of an opening jet and, by means of an agent jet, the agent is injected between the fanned-open pages of the book; in this, for reducing the flow resistance prevailing between the individual pages 4 of the book 3, a suction takes place on the opposite side. In addition, provision is made for a slot-shaped, curved opening-jet nozzle 12 for generating a suitable opening jet 11.

40 Claims, 9 Drawing Sheets

METHOD FOR DISACIDIFYING PAPER PRODUCTS WITH PRINTINGS OR INSCRIPTIONS

DESCRIPTION

Figure 1:
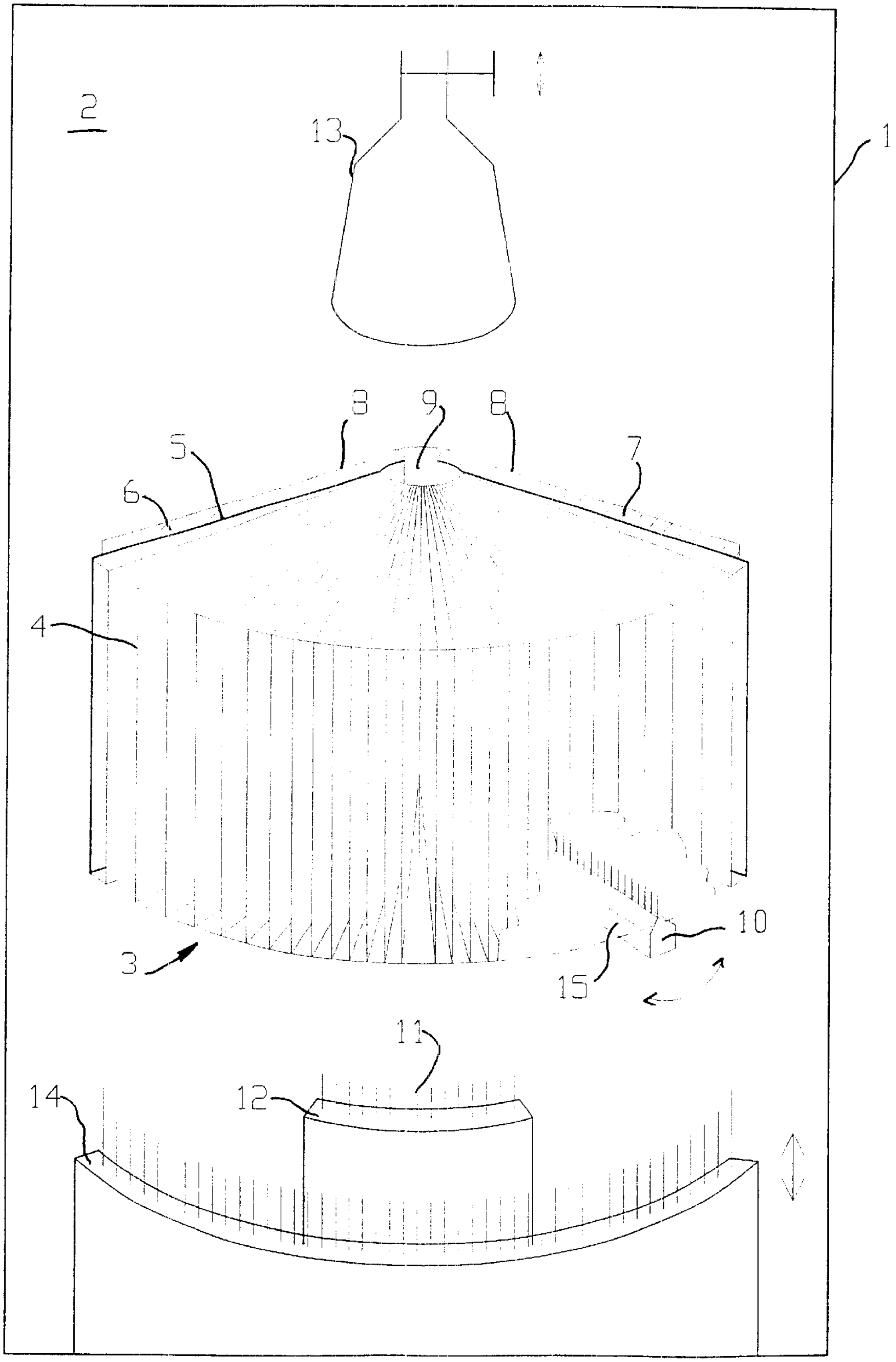

The present invention relates to a method for deacidification of printed or inscribed paper products (in the following called "books" for short) as well as a corresponding device for deacidification.

A generic method as well as a corresponding device is already known from WO 96/12066. Here, the book, in a standing, opened position, is fanned open with respect to its individual pages by means of a large-volume opening jet and the book is treated by means of jets of fluidized agent and separate air jets arranged individually along a swivel arm moving back and forth underneath the book in an alternating arrangement between the fanned-open pages of the book. In the case of the method mentioned above, it has become evident that the agent is not always introduced between the individual pages of the book in a uniform manner.

The object of the present invention is to improve the generic method as well as the associated device in such a way that the agent can be introduced between the pages of the book in the most uniform manner possible.

The present object is achieved by the fact that the opening jet has a curved shape when viewed in section. The curve is, appropriately, orientated towards the spine of the book. Achieved thereby is an optimal opening of the book pages for the introduction of the agent, and this both in the center region of the book and at the edge regions, i.e. in the vicinity of the cover of the book. The curved opening jet has a flat form when viewed in section. Appropriately, the opening jet is slightly inclined towards the spine of the book.

For treating especially large books, volumes of newspapers, or files, according to the invention the book are additionally acted upon from the side turned away from the spine by a further opening jet, which appropriately is likewise arranged so as to be inclined towards the spine of the book. Attained thereby is an optimal opening of the individual book pages up to the spine of the book.

This additional opening jet is appropriately, likewise viewed in section, a curved opening jet with a larger diameter in comparison to the main opening jet.

It is advantageous when this additional opening jet is adjustable with respect both to its height position and its inclination towards the spine of the book, in order to be able to appropriately treat books of different sizes. This additional opening jet likewise has a flat shape when viewed in section.

A further aspect of the present invention concerns the reduction of the flow resistance prevailing between the individual pages of the book. According to the invention, this is achieved by the fact that on the opposite page of the book a purposeful suction is undertaken.

The reduction of the flow resistance makes possible a lower injection pressure and, as a consequence, a reduction of the mechanical stress on the individual pages of the book, without, on the other hand, degrading the treatment result.

In order to ensure the greatest possible reduction of the flow resistance, the suction appropriately takes place specifically in the region of the exit point of the jet of agent from the upper side of the book, preferably in the region of the book facing the spine of the book.

In order to enable the treatment of differently sized books, the suction is varied in position depending of the type of book to be treated. The varying of this position can, if necessary, even take place automatically.

The method according to the invention includes, also coordinately claims, the idea of generating the jet of agent by premixing an atomizer gas, e.g. pressurized air, and the fluidized agent beforehand in a mixing chamber and subsequently introducing the homogenized mixture into the book. Here, the mixing preferably takes place directly in a mixing chamber of the agent nozzle. This method improves the uniformity of the introduction of the agent between the individual pages in comparison to the method in the prior art mentioned in the introduction, in which method provision is made for separate jets of the agent alternating with jets of air. An uneven acting upon the book by the agent is thus avoided.

In order to achieve the greatest possible uniformity of the agent in the jet of agent, the mixing chamber is subject to overpressure, the agent and/or the atomizer gas appropriately being fed to the agent nozzle from both sides.

According to the present invention, the jet of agent is produced by means of an agent nozzle with a slot-shaped exit opening, which sweeps the fanned-open pages of the book back and forth in a pendular manner. For optimization of the introduction of agent between the individual pages of the book in the region of the spine of the book, the jet of the agent is orientated somewhat towards the spine of the book, as far as the core of the jet is concerned. In addition, according to a further development, the angle of inclination of the core of the jet increases from the outside to the inside of the book, whereby an optimal acting upon the book is achieved.

A further concept, as a coordinated component of the entire concept, consists in injecting a paper-strengthening means for reinforcing the paper, appropriately together with the agent during the treatment process.

The paper-strengthening measure should appropriately be carried out during the conditioning step following the treatment step under increased atmospheric moisture. In order to accelerate the paper strengthening, during the conditioning step activating means are additionally introduced.

In order to ensure an especially high flexibility of treatment, some jets of the agent can advantageously be made available as well without paper-strengthening means, whereby when necessary (e.g. during the treatment of a book furnished with very thin paper) a switching between the jets of the agent takes place.

By virtue of the fact that both the conditioning and the activating of the paper-strengthening means take place at the same time by means of one moist-air jet, the paper strengthening can be advantageously integrated into the existing process without additional and costly process steps.

In order to increase the moisture penetration of the jet in the region of the individual fanned-open book pages, the moist-air jet is acted upon by a flow-influencing element moving back and forth over the cross-section of the jet, e.g. in the form of a flat, rod-shaped structure.

The amount of agent required for the treatment of a book consists of the portion of agent for the neutralization of the paper plus that portion for ensuring a so-called "alkaline reserve". The agent is applied by the present method in a constant manner, whereby the amount to be supplied is determined by means of the weight of the book to be treated. From this results the so-called "base time" for treating the book. Rough papers can be sufficiently treated using the base time. Smooth papers, on the other hand, accept the agent less well, and must therefore, as a rule, be treated longer. Until now, it was only possible to have the surface roughness inexactly estimated by operating personnel and then to always treat the books somewhat longer, i.e. with an additional time for certainty, which led to an increased consumption of the agent; in addition, the books to be treated contained an excessive amount of the agent.

The method according to the invention proposes on this point, and coordinately claims, to determine the roughness of the paper to be treated by means of an optical or acoustic paper-roughness measurement, and with the aid of the determined roughness, to set the degree of treatment, in particular the length of the treatment with the agent. Through these measures, for every quality of paper the optimal portion of agent is introduced into the paper.

Furthermore, there exists a special problem in the treatment of paper pages in so-called "organizers", due to the clamp that holds the paper in these. This type of organizers, for one thing, have a very differing degree of fullness, and for another thing the paper stack is not located inside the organizer in the exact center.

In this connection, the invention proposes, as is claimed in coordinated manner, that the paper pages to be placed in organizers be gripped on both sides, during the treatment, from the outside inwards in their region adjacent to the spine of the organizer, in simulation of a bound-together spine. In this way, the organizer so gripped can be acted upon by the agent just as a book is.

In addition, the invention includes a device for deacidification treatment of printed and paper products, in which device, for the reduction of the flow resistance inside the book during the treatment with the agent, an additional suction nozzle is positioned on the side of the book opposite the opening-jet nozzle. In order to adapt to the individual book to be treated, the suction nozzle is appropriately designed to be adjustable in height. An especially great reduction of the flow resistance is achieved by the fact that the shape of the suction nozzle, viewed in cross-section, approximately corresponds to the contour of the book in the region of the spine of the book and/or the suction nozzle is positioned approximately the same distance from the book as the opening-jet nozzle.

In order to achieve an optimal fanning-open of the positioned book, the exit opening of the opening-jet nozzle is designed as a curved slot nozzle, e.g. as an slot nozzle in the shape of an arc of circle.

Further, it is of advantage when the slot nozzle is inclined slightly from the parallel towards the spine of the book.

For the treatment of especially large books, files, organizers, etc., according to a further arrangement of the device according to the invention provision is made for an additional opening-jet nozzle positioned laterally to the book on the side opposite the spine of the book, the opening jet being inclined towards the spine of the book with regard to its jet core. The opening-jet nozzles can be arranged so as to be slidable and/or tiltable towards the spine of the book in order to ensure different angular positions.

According to a further arrangement, the agent nozzle is designed as a mixing nozzle, in which a mixture of agent and atomizer gas is made available for injection into the book, which has the consequence that an especially uniform acting upon the book with agent is achieved.

The agent nozzle, according to a special form of embodiment of the invention, is designed with a slot shape and is mounted on a pivot arm. The dimensioning of the agent nozzle lies in a region from 0.1 to 1.0 mm, preferably 0.2 to 0.7 mm.

The determination of the direction of the jet of agent takes place through the alignment of individual connecting ducts between an atomizer chamber, in particular an air chamber, as well as a mixing chamber, into which the fluidized agent is injected. The connecting ducts are appropriately inclined towards the spine of the book.

For treating organizers, the support of the device displays gripping means for treating paper a pages placed into the organizer, which means grip the individual paper pages as a whole at their side in the region adjacent to the spine of the organizer and thereby simulate a rigid book spine with the organizer. In this way, the organizer can be treated with the agent like a book in the above-described manner.

The gripping means include, on both sides of the main outside surface of the individual paper pages, position-adjustable support rollers that are orientated towards the paper and, in the gripping state, rest against the outsides of the paper.

In order to compensate for different fill states of an organizer, each of the support rollers is mounted eccentrically with respect to its axis, so that by rotating the support roller around its axis a change of spacing between the support roller and the paper can be achieved in a simple manner.

Over lengths of the paper pages several support rollers per page can be arranged.

Figure 2:
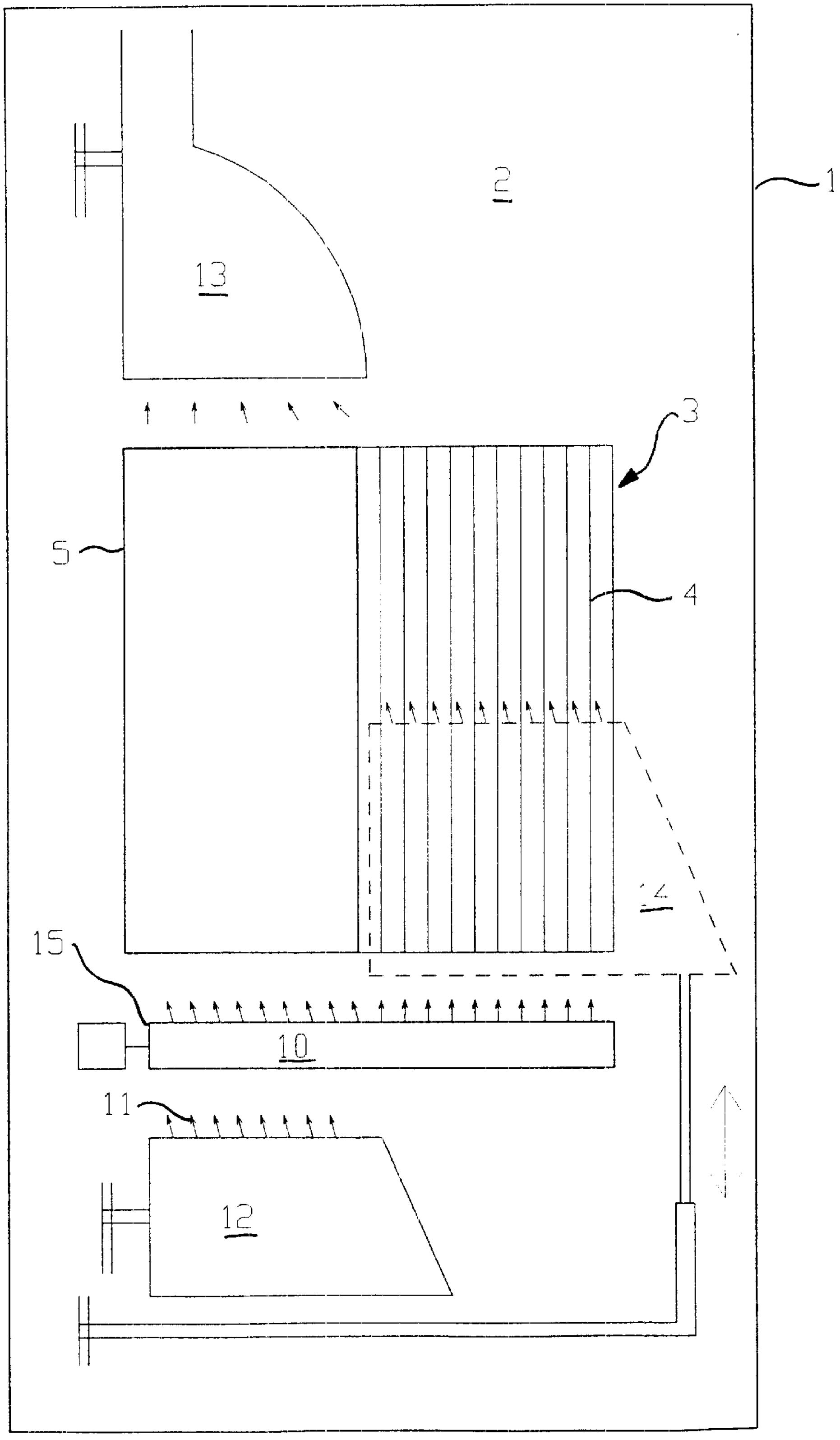
Figure 3:
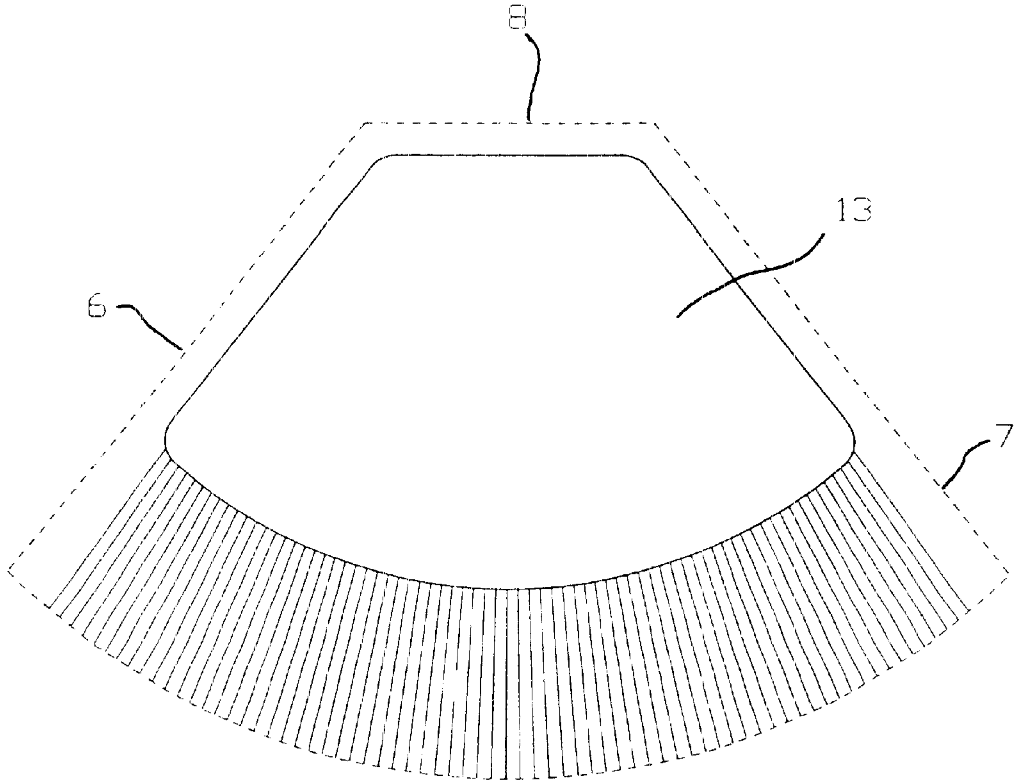
Figure 4A:
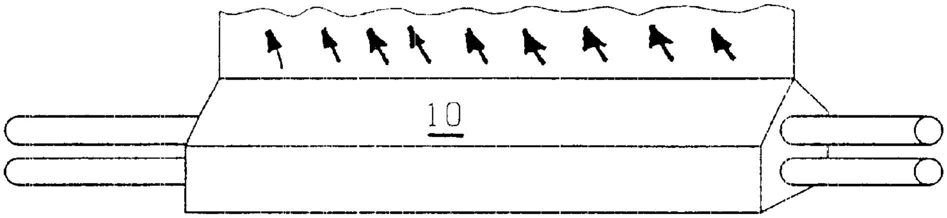
Figure 4B:
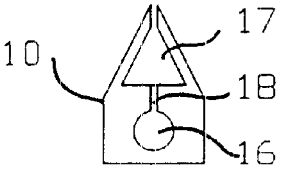
Figure 4C:
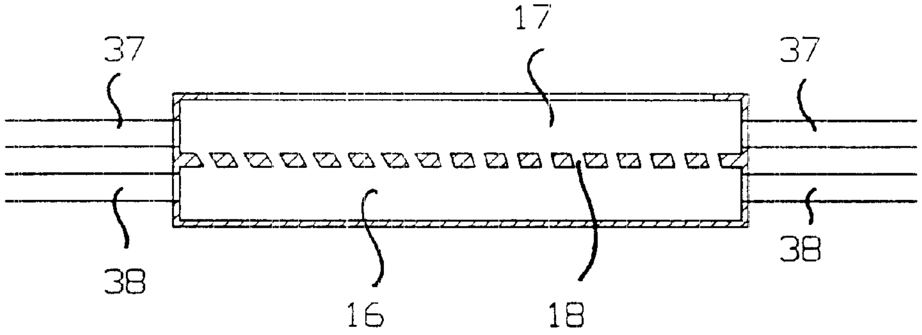

An advantageous arrangement of the method and the device according to the invention is explained in detail below with the aid of the drawn figures. They show:

FIG. 1: a greatly simplified, schematic representation of the device according to the invention inside a treatment area, in frontal view FIG. 2: the representation according to FIG. 1 in side view FIG. 3: a sectional view of the suction nozzle FIG. 4: a perspective representation of the agent nozzle (FIG. 4*a*), a cross-sectional representation (FIG. 4*b*), as well as a longitudinal representation in the region of the exit of the jet of the agent (FIG. 4*c*)

Figure 5:
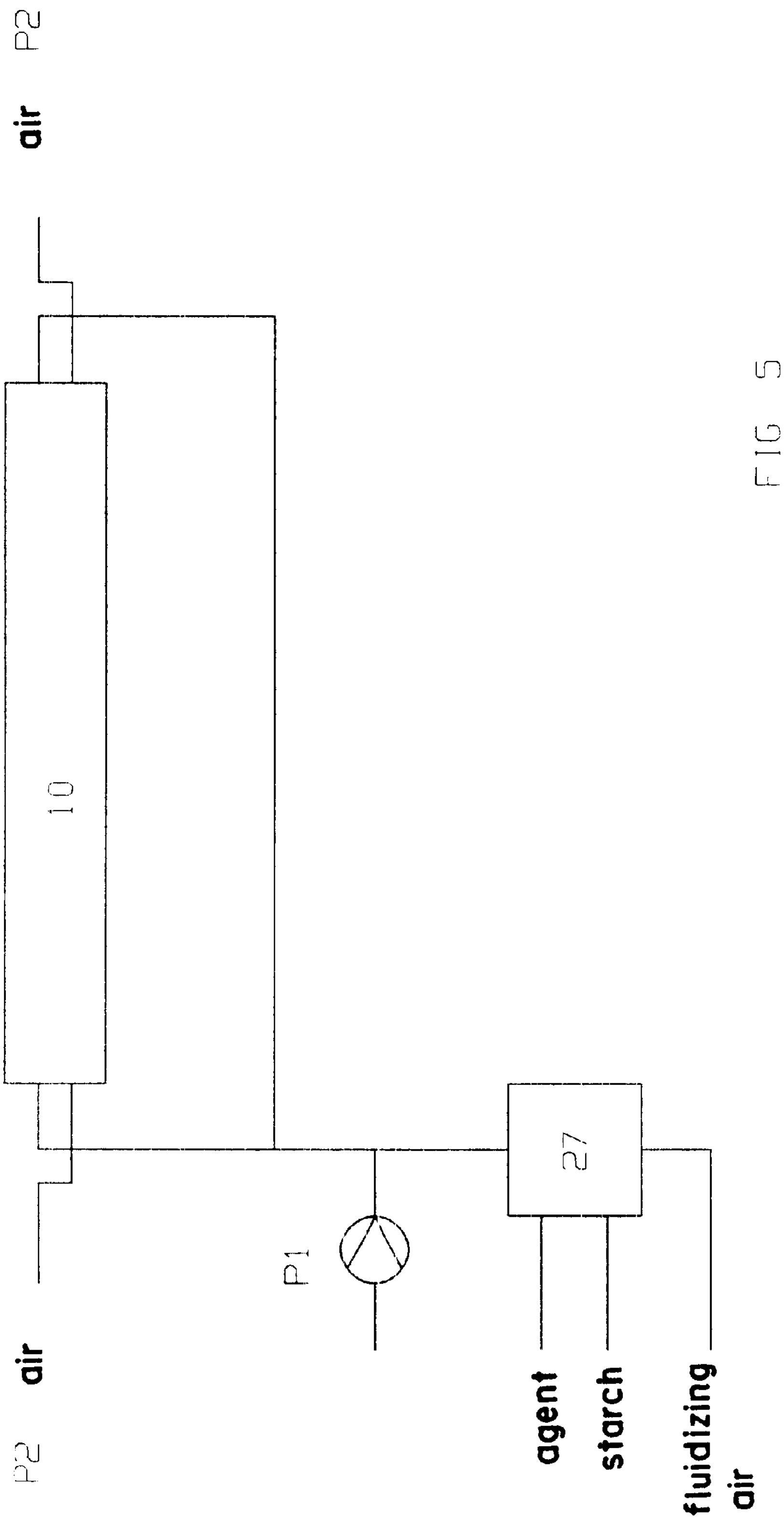
Figure 6:
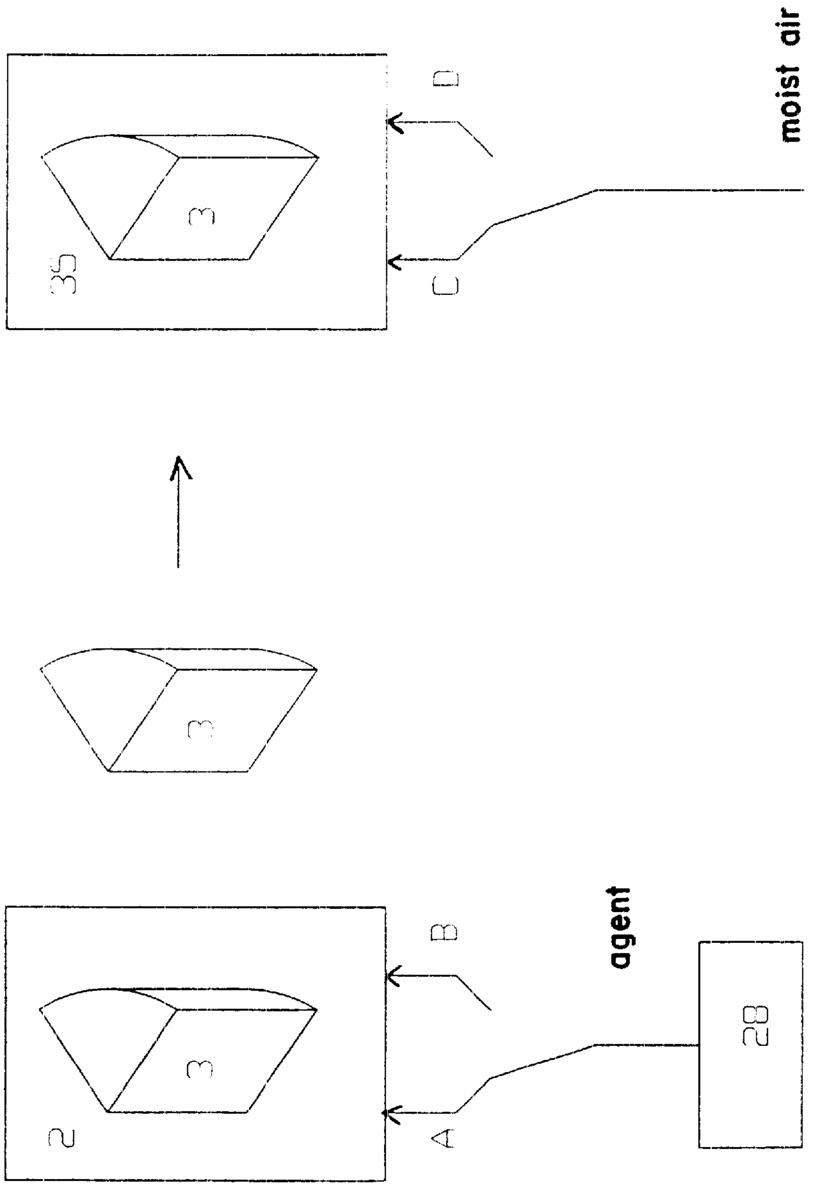
Figure 7:
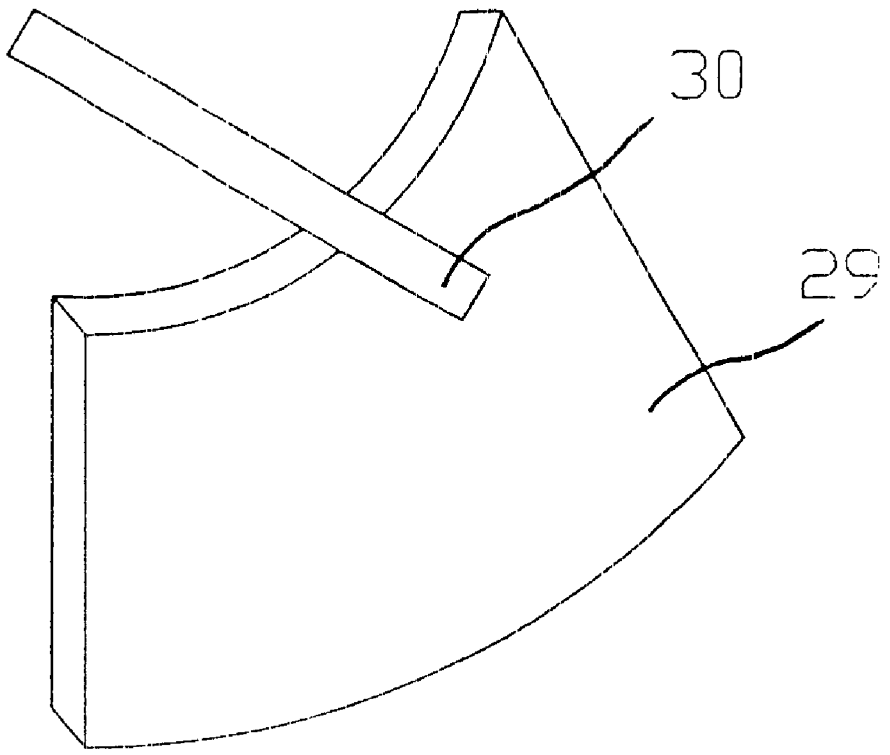
Figure 8:
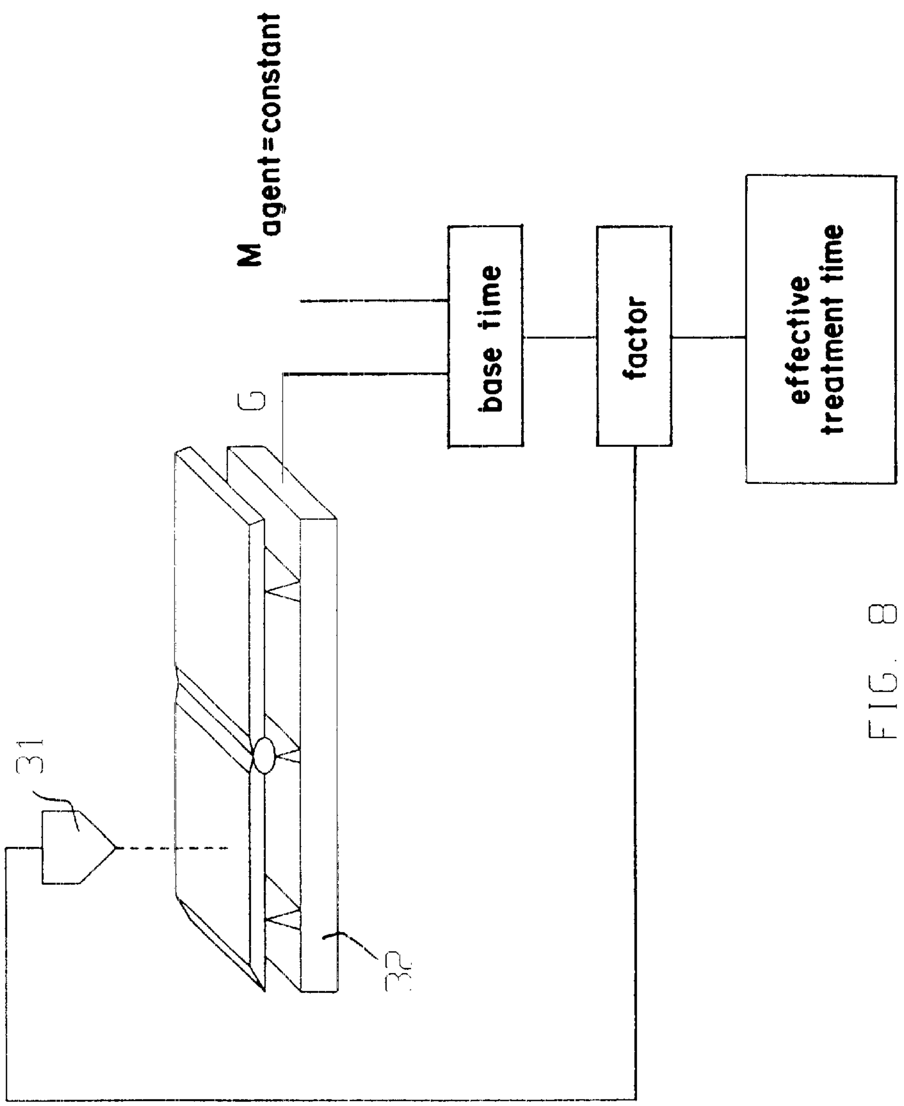
Figure 9A:
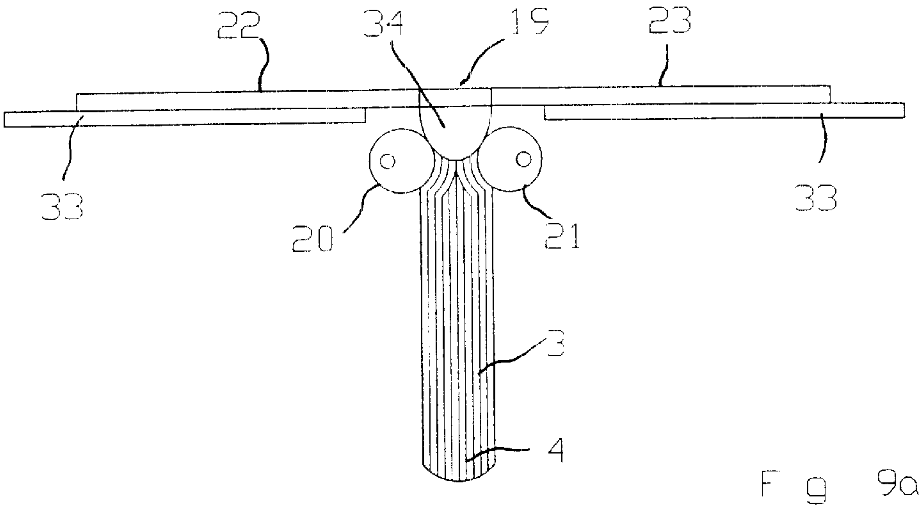
Figure 9B:
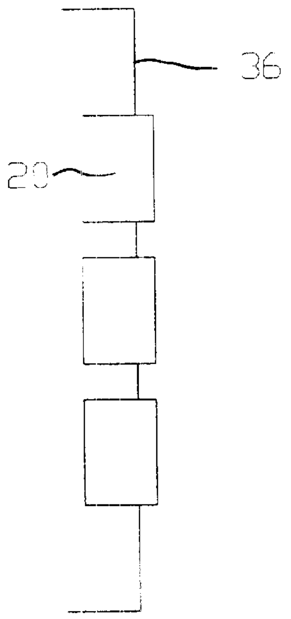

FIG. 5: a greatly simplified, schematic representation of the processing of the jet of the agent FIG. 6: a greatly simplified representation of the measures for conditioning as well as stiffening of the paper FIG. 7: a perspective representation of the moist-air nozzle with flow obstructer FIG. 8: a greatly simplified, schematic representation of the determination of the surface roughness for adapting the effective treatment time FIG. 9: a greatly simplified, schematic representation of the support for the treatment with agent of organizers, in plan view (FIG. 9*a*) as well as side view (FIG. 9*b*) of one half of the support Reference numeral 1 in FIG. 1 indicates the device for deacidification of books and the like, in its entirety. It includes a closed or at least closable treatment space 2, in which is located at least one support 5 for positioning a book 3 or the like. The support 5 represented in FIG. 1 has a knife beam 9 that can be pushed up against the spine 8 of the book 3 in order to position the latter. The book 3 is here held standing and open in the support 5, in a manner known per se, the two book covers 6, 7 in addition being fixed on the support.

For generating an opening jet 11 in the form of a curved, flat jet, located on the underside of the book 3 is an opening-jet nozzle 12, as a slot nozzle with the shape of an arc of a circle and inclined slightly towards the spine 8 of the book, which inclination ensures during operation a fanning-open of the individual book pages 4.

Designed a distance away from this is a corresponding additional opening-jet nozzle 14 with a larger diameter, and this preferably in the outer circumferential region of the book pages in each case, as is evident from FIG. 2.

Both of the opening-jet nozzles 12, 14 are variable with respect to their radial position, height position, as well as their angle of inclination, in order to ensure the best possible adaptation to the book 3 to be treated in each case, and thus to ensure an optimal fanning open.

Located at the upper side, approximately opposite to the opening-jet nozzle 12 at a comparable distance, is the suction nozzle 13. It serves to reduce the flow resistance during the passage of the agent.

Viewed in cross-section, the shape of the suction nozzle 13 (see FIG. 3) approximately corresponds to the shape of the contour of the opened book 3 in the region of the spine 8 of the book.

As can also be plainly seen from FIG. 2, the agent nozzle 10 is located between the book 3 and the two opening-jet nozzles 12, 14 positioned at the underside of the of the book 3.

Both the opening-jet nozzle 12 and the opening-jet nozzle 14 with a larger diameter are, on the one hand, adjustable in height (see FIG. 2), and on the other hand are designed so as to be adjustable in their inclination with respect to the book 3. The same holds true for the suction nozzle 13. By these means, in each case the optimal adjustment for the book 3 in question can be undertaken.

The agent nozzle 10, during the operation of the collective device 1, moves back and forth underneath the bottom side of the book 3 by the aid of a suitable drive means (not represented), while positioned on a swing arm 15.

The agent nozzle 10 is formed, according to FIG. 4*a*, as a slot nozzle with a slot width of approximately 0.4 mm, and displays on both sides in each case an inlet 37 for the agent, which is transported by fluidized, i.e. pressurized air, as well as in each case an outlet 38 for pressurized air as an atomizer gas.

According to FIG. 4*b*, the fluidized agent is carried into a triangular mixing chamber 17 arranged at the top side, while pressurized air is brought into the atomizer-gas chamber 16 and penetrates into the mixing chamber 17. Here, the atomizer-gas chamber 16 is subject to overpressure, just as does the mixing chamber 17.

In order to achieve a directing of the jet of agent exiting at the top side, according to FIG. 4*c* the connecting ducts 18 are arranged in such a manner that in the region of the spine 8 of the book they display a greater inward inclination than in the outer region in question of the agent nozzle 10. Achieved hereby is the fact that the intermediate space between the book pages in the region of the spine of the book are optimally acted upon by the agent.

According to a further development of the present invention, in addition starch is added to the agent in the so-called "fluidization chamber" 27 (see FIG. 5), and together with the agent is injected through the agent nozzle 10 into the book 3. The starch acts here as a paper-strengthening means. It is activated in the subsequent conditioning step by increased air moisture and effects a strengthening of the paper being treated. The paper treated in this way feels "natural" to the touch.

According to FIG. 6 a book 3 with pages of normal thickness is treated with agent via supply line A in the treatment space 2 and is subsequently transferred into conditioning region 35. There, the book 3 is acted upon with moist air via supply line C, whereby the agent, which was previously introduced into the book 3 as dry powder, is activated. Should a book 3 with very thin pages be treated, then in the treatment space 2 a switch will be made to supply line B, through which, together with the agent, starch is additionally injected into the book 3. Following this, the book 3 is transferred to the conditioning region 35 and there, via supply line D, is likewise acted upon by moist air as well as activation means contained in the moist air, in particular formaldehyde. The activation means effects an especially quick conversion of the starch, i.e. strengthening of the book pages.

FIG. 7 shows the moist air nozzle 29 used in the conditioning, formed as a curved slot nozzle, at whose upper side is situated a flow-influencing element 30 that can be moved back and forth. By means of the flow-influencing element 30, the flow exiting the slot nozzle in a uniform manner is interrupted, whereby in the region of the opened book 3 the individual book pages undergo an additional mechanical impingement. In this way the moisture gets into the spaces between the individual book pages in an even more complete manner.

A further arrangement of the process and device according to the invention includes a roughness sensor 31, by means of which the surface roughness of the book pages is determined, for example, optically or acoustically. In addition, the weight of the book 3 is determined by a scale 32, and this value, together with the application amount of the agent, results in a base time. The measured roughness is equated with a factor, by which the base time is changed into an effective treatment time depending on the roughness of the paper to be treated. If the paper is especially smooth, then this leads to a lengthened treatment time. On the other hand, for rough papers the treatment time can be correspondingly shortened.

For treatment of so-called "organizers", the device according to the invention includes a support 33, consisting of support rollers 20, 21 arranged laterally to the paper pages 4 fastened into the organizer 3. In this, the support 33 comprises support rollers 20, 21 that in each case relate to all of the paper pages 3. The intermediate spaces between the support rollers 20, 21 are intended to be recesses for the two clamps 34 of the organizer.

The support rollers 20, 21 are mounted along a rod 36 (see FIG. 9*b*) in an eccentric manner, and consequently can be adjusted well to the degree of fullness of the organizer, by means of lateral pressure. The support rollers 20, 21 act to hold fast the contents of the organizer in the region of the clamp 34 of the organizer and thus to simulate a "book spine". The organizer covers 22, 23 are held by plate-type supports 33 either in one plane or at angles with respect to the spine 19 of the organizer. The acting upon the organizer by the agent as well as, if necessary, the strengthening means, take place in the manner already described above.

After the treatment, the supports 33 are removed and the support rollers 20, 21 are withdrawn laterally, so that the organizer, having been treated with the agent, can be removed.

What is claimed is:

1. Method for deacidification of inscribed or printed paper products in which method the pages of said inscribed or printed paper products to be treated are fanned open by means of an opening jet blowing through the individual pages from the underside towards the topside, or vice versa, and, by means of a jet charged with the agent the agent is injected between the fanned-open pages of said inscribed or printed paper products, characterized by the fact that the opening jet (11) displays a curved shape when viewed in section.

2. Method according to claim 1, characterized by the fact that the opening jet (11) is shaped flat when viewed in section.

3. Method according to claim 1, characterized by the fact that the opening jet (11) is inclined towards the spine (8) of said inscribed or printed paper products.

4. Method according to claim 1, characterized by the fact that said inscribed or printed paper products is additionally acted upon from the side turned away from the spine (8) of said inscribed or printed paper products by an additional opening jet (14).

5. Method according to claim 4, characterized by the fact that the additional opening jet (25), when viewed in section, is likewise a curved as well as flat opening jet (25).

6. Method for deacidification of inscribed or printed paper products in which method the pages of said inscribed or printed paper products to be treated are fanned open by means of an opening jet, and by means of an agent jet the agent is injected between the fanned-open pages of said inscribed or printed paper products, in particular according to claim 1, characterized by the fact that in order to reduce the flow resistance prevailing between the individual pages (4) of said inscribed or printed paper products a suction is undertaken on the opposite side.

7. Method according to claim 6, characterized by the fact that the suction takes place purposefully in the region of the exiting of the agent.

8. Method according to claim 6, characterized by the fact that the position of the suction is adjusted depending on the type of said inscribed or printed paper products to be treated.

9. Method for deacidification of inscribed or printed paper products in which method the pages of said inscribed or printed paper products to be treated are fanned open by means of an opening jet blowing through the individual pages from the underside towards the topside, or vice versa, and, by means of a jet charged with the agent the agent is injected between the pages of said inscribed or printed paper products, characterized by the fact that for producing the agent jet an atomizer gas and the agent in fluidized form are premixed in a mixing chamber (17) of the agent nozzle (10) and subsequently introduced into said inscribed or printed paper products.

10. Method according to claim 9, characterized by the fact that the agent jet, as a mixture of atomizer gas and fluidized agent, is delivered to the book via a slot-shaped exit opening in the agent nozzle (10), and that the agent nozzle (10) is moved on the underside of said fanned-open inscribed or printed paper products.

11. Method according to claim 9, characterized by the fact that the fluidized agent as well as the atomizer gas are supplied from both sides of the agent nozzle (10).

12. Method according to claim 1, characterized by the fact that the agent jet, with regard to the orientation of its jet core, is directed towards the spine (8) of said inscribed or printed paper products.

13. Method for deacidification of inscribed or printed paper products in which method the pages of said inscribed or printed paper products to be treated are fanned open by means of an opening jet, and by means of an agent jet the agent is injected between the fanned-open pages of said inscribed or printed paper products, in particular according to claim 1, characterized by the fact that for reinforcing the paper a paper-strengthening means is injected.

14. Method according to claim 13, characterized by the fact that the paper-strengthening means is injected into said inscribed or printed paper products together with the agent.

15. Method according to claim 13, characterized by the fact that an activating of the paper-strengthening means takes place during a conditioning step that follows the treatment step.

16. Method according to claim 15, characterized by the fact that during the conditioning step, activation means for the paper-strengthening means is applied.

17. Method according to claim 13, characterized by the fact that at least one agent jet without paper-strengthening means is made available as well, and when necessary a switching between the at least one agent jet takes place.

18. Method according to claim 15, characterized by the fact that the conditioning takes place by means of a jet of moist air.

19. Process according to claim 18, characterized by the fact that the moist-air jet is acted upon by means of a flow-influencing element (30) that moves back and forth over the cross section of the jet.

20. Method for deacidification of inscribed or printed paper products in which method the pages of said inscribed or printed paper products to be treated are fanned open by means of an opening jet, and by means of an agent jet the agent is injected between the fanned-open pages of said inscribed or printed paper products, in particular according to claim 1, characterized by the fact that before the treatment with the agent the roughness of the paper to be treated is determined, and with the aid of the determined roughness the degree of treatment with the agent is set.

21. Method according to claim 20, characterized by the fact that the duration of the treatment is set depending on the determined roughness.

22. Method according to claim 1, characterized by the fact that the roughness of the paper is determined optically or acoustically.

23. Method for deacidification of inscribed or printed paper products in which method the pages of said inscribed or printed paper products to be treated are fanned open by means of an opening jet, and by means of an agent jet the agent is injected between the fanned-open pages of said inscribed or printed paper products, in particular according to claim 1, characterized by the fact that the paper pages held in organizers during the treatment are gripped from the outside on both sides in their region adjacent to the spine (19) of the organizer, in order to stimulate a rigidly bound spine.

24. Device for deacidification treatment of printed or paper products with at least one support for the fanned-open positioning of said inscribed or printed paper products to be treated, at least one opening jet nozzle (12) for fanning open said inscribed or printed paper products, as well as at least one agent-jet nozzle (10), characterized by the fact that an additional suction nozzle (13) is positioned on the side of said inscribed or printed paper products opposite that of the opening-jet nozzle (12).

25. Device according to claim 24, characterized by the fact that the suction nozzle (13) is designed to be adjustable in height.

26. Device according to claim 24 characterized by the fact that the shape of the suction nozzle (13), considered in cross-section, approximately conforms to the contour of said inscribed or printed paper products, at least in the region of the spine (8) of said inscribed or printed paper products.

27. Device according to claim 24, characterized by the fact that the suction nozzle (13) is positioned at approximately the same distance from said inscribed or printed paper products as the opening-jet nozzle (12).

28. Device for deacidification treatment of printed or paper products with at least one support for the farmed-open positioning of said inscribed or printed paper products to be treated, at least one opening-jet nozzle (12) for fanning open said inscribed or printed paper products, as well as at least one agent-jet nozzle (10), in particular according to claim 1, characterized by the fact that provision is made for a slot nozzle with a curved form as the opening-jet nozzle (12).

29. Device according to claim 24, characterized by the fact that provision is made for at least one additional opening-jet nozzle (14) laterally to said inscribed or printed paper products on the side opposite the spine (8) of said inscribed or printed paper products, and that the opening jet (11), with regard to its jet core, is inclined towards the spine (8) of said inscribed or printed paper products.

30. Device according to claim 24, characterized by the fact that the additional opening-jet nozzle (14) is arranged so as to be displaceable and/or, in order to permit angular positions, swingable towards the spine (8) of said inscribed or printed paper products.

31. Device for deacidification treatment of printed or paper products with at least one support for the fanned-open positioning of said inscribed or printed paper products to be treated, at least one opening-jet nozzle (12) for fanning open said inscribed or printed paper products, as well as at least one agent-jet nozzle (10), in particular according to claim 1, characterized by the fact that the agent nozzle (10) is designed as a mixing nozzle in which a mixture of fluidized agent and atomizer gas can be produced.

32. Device according to claim 31, characterized by the fact that the exit opening of the agent nozzle (10) has a slot shape.

33. Device according to claim 1, characterized by the fact that the agent nozzle (10) is mounted on a swing arm (15).

34. Device according to claim 32, characterized by the fact that the agent nozzle (10) includes an atomizer-gas chamber (16) as well as the mixing chamber (17) with individual connecting ducts (18) that connect the atomizer-gas chamber (16) and the mixing chamber (17).

35. Device according to claim 34, characterized by the fact that the connecting ducts (18) are inclined towards the spine (8) of said inscribed or printed paper products.

36. Device for deacidification treatment of printed or paper products with at least one support for the fanned-open positioning of said inscribed or printed paper products to be treated, at least one opening-jet nozzle (12) for fanning open said inscribed or printed paper products, as well as at least one agent-jet nozzle (10), in particular according to claim 1, characterized by the fact that the support (5) includes gripping means for treatment of paper pages held in an organizer, which gripping means grip, from sides, the individual paper pages in their entirety in the region facing the spine (19) of the organizer.

37. Device according to claim 36, characterized by the fact that on both sides of the mail outer surfaces of the individual paper pages, provision is made for support rollers (20, 21) that are orientated towards the paper and adjustable in their position.

38. Device according to claim 37, the support rollers (20, 21) are mounted eccentrically with respect to their axes.

39. Device according to claim 36, characterized by the fact that provision is made for several support rollers (20, 21) per side over the side lengths of the paper pages.

40. The method of claim 10, wherein said agent nozzle (10) is moved back and forth.

* * * * *